United States Patent Office 3,138,623

Patented June 23, 1964

3,138,623

21-HALO-20-HYDROXYPREGN-4-EN-3-ONES AND ESTERS THEREOF

Clarence G. Bergstrom, Chicago, Ill., assignor to G. D. Searle & Co., Chicago, Ill., a corporation of Delaware No Drawing. Filed Aug. 3, 1962, Ser. No. 214,506
13 Claims. (Cl. 260—397.47)

The invention hereinafter described relates to novel steroidal compounds characterized by a hydroxy group at the 20-position and, more particularly, to 21-halo-20-hydroxypregn-4-en-3-ones and the corresponding esters, which substances are represented by the structural formula

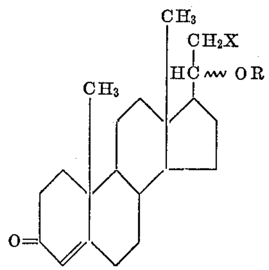

wherein X is symbolic of a halogen of atomic number less than 50, e.g., fluorine, chlorine, or bromine, R represents hydrogen or a lower alkanoyl radical, and the wavy line indicates the alternative "α" or "β" configuration of the substituent at carbon atom 20. These alternative configurations are conventionally represented by the following structural formulas

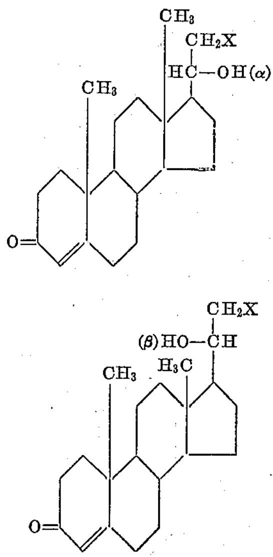

Typical of the lower alkanoyl radicals encompassed in the R term are formyl, acetyl, propionyl, butyryl, valeryl, caproyl, and the branched-chain groups isomeric therewith.

The compounds of this invention are conveniently manufactured by utilization of 21-halopregn-4-ene-3,20-diones as starting materials. Reaction of the latter substances with a suitable reducing agent results in conversion of the 20-oxo to a 20-hydroxy group, affording a mixture of the 20α-hydroxy and 20β-hydroxy isomers. The use of sodium borohydride as a reducing agent results in selective reduction at the 20-position, affording a predominance of the 20β-isomer. The reducing agent lithium aluminum hydride, on the other hand, causes reduction of the 3-oxo position also, together with a relatively lesser predominance of the β-isomer. In the latter instance, it is apparent that an oxidative step is required to regenerate the 3-oxo group. The latter processes are specifically illustrated by the reaction of 21-fluoropregn-4-ene-3,20-dione with sodium borohydride in methanol to afford, after chromatographic separation, 21-fluoro-20β-hydroxypregn-4-en-3-one and 21-fluoro-20α-hydroxypregn-4-en-3-one, and by the reaction of 21-chloropregn-4-ene-3,20-dione with lithium aluminum hydride in tetrahydrofuran, resulting in 21-chloropregn-4-ene-3,20-diol, the oxidation of which in isopropyl alcohol with manganese dioxide produces, after separation by chromatography, 21-chloro-20β-hydroxypregn-4-en-3-one and 21-chloro-20α-hydroxypregn-4-en-3-one.

Acylation of the instant 20-ols with suitable reagents affords the 20-(lower alkanoyl)oxy compounds of the present invention. Typically, 21-fluoro-20β-hydroxypregn-4-en-3-one is contacted with acetic anhydride and pyridine, resulting in 20β-acetoxy-21-fluoropregn-4-en-3-one.

The compounds of this invention are useful as a result of their valuable pharmacological properties. They are, for example, diuretic agents in view of their ability to inhibit the sodium-retaining effect of desoxycorticosterone acetate.

The compounds which constitute this invention and the methods for their production will appear more fully from the examples which follow. These examples are given for the purpose of illustration only and are not to be construed as limiting the invention either in spirit or in scope. In these examples, temperatures are given in degrees centigrade (° C.) and quantities of materials in parts by weight unless otherwise noted.

*Example 1*

To a solution of 4.35 parts of 21-fluoropregn-4-ene-3,20-dione in 40 parts of methanol is added 0.14 part of sodium borohydride, and the resulting reaction mixture is kept at room temperature for about 10 minutes, after which time 2.1 parts of acetic acid and 50 parts of water are added. This mixture is then cooled for several hours, and the resulting crude product is collected by filtration to afford 21-fluoro-20-hydroxypregn-4-en-3-one, melting at about 117–165°.

A solution of the latter crude product in benzene is chromatographed on a silica gel column, and the column is eluted with 10% ethyl acetate in benzene. Concentration of this eluate to dryness affords a solid which is recrystallized from acetone-hexane, affording prismatic crystals of 21-fluoro-20β-hydroxypregn-4-en-3-one, melting at about 189–192.5° and further characterized by an optical rotation of +87.8° in chloroform, by infrared maxima at 2.94, 6.00, and 6.18 microns and by an ultraviolet absorption maximum at about 241.5 millimicrons with a molecular extinction coefficient of about 16,900. It is represented by the structural formula

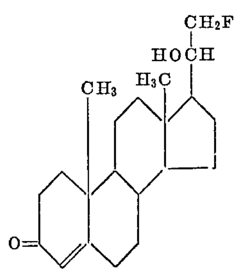

Further elution of the chromatographic column with 15% ethyl acetate in benzene affords a fraction which is recrystallized from acetone-hexane. The resulting crystals are separated into prisms and needles, and the needle-like crystals are again recrystallized from acetone-hexane to afford pure 21-fluoro-20α-hydroxypregn-4-en-3-one, melting at about 168.5–170° and characterized also by infrared maxima at 2.93, 6.00, and 6.20 microns, by an ultraviolet absorption maximum of 241 millimicrons with a molecular extinction coefficient of about 16,700, and by the structural formula

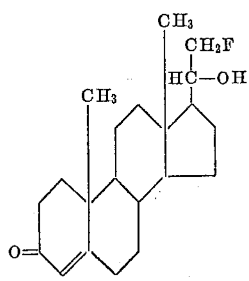

*Example 2*

A solution of 0.53 part of 21-fluoro-20β-hydroxypregn-4-en-3-one in 5.4 parts of acetic anhydride is heated on the steam bath for about 2 hours, after which time the reaction mixture is poured slowly into about 200 parts of ice water. The resulting gummy product which separates is recrystallized from aqueous acetone to yield crude 20β-acetoxy-21-fluoropregn-4-en-3-one, melting at about 117–164°. This crude product is purified by adsorption on silica gel followed by elution with 10% ethyl acetate in benzene. Recrystallization from acetone-hexane of the eluted fraction affords pure 20β-acetoxy-21-fluoropregn-4-en-3-one, melting at about 180.5–182.5°, displaying an optical rotation of +131° in chloroform, and characterized also by infrared absorption maxima at 5.76, 5.96, 6.17, and 7.91 microns and by an ultraviolet absorption maximum of 241.5 millimicrons with a molecular extinction coefficient of about 16,600. This substance is rerpesented by the structural formula

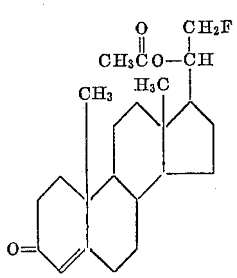

*Example 3*

The reaction of 0.53 part of 21-fluoro-20α-hydroxypregn-4-en-3-one with 7 parts of propionic anhydride according to the procedure described in Example 2 results in 21-fluoro-20α-propionoxypregn-4-en-3-one.

*Example 4*

To a stirred solution of 1.08 parts of lithium aluminum hydride in 89 parts of tetrahydrofuran is added, over a period of about 13 minutes, a solution of 21 parts of 21-chloropregn-4-en-3,20-dione in 266 parts of tetrahydrofuran, and this mixture is kept at room temperature for about 2 minutes longer. At this time, approximately 100 parts by volume of saturated aqueous sodium potassium tartrate is added, and the organic layer is separated, then is washed with saturated aqueous sodium potassium tartrate. The organic layer is again separated and poured slowly, with stirring, into 2000 parts of a mixture of ice and water. The resulting precipitate is collected by filtration to afford crude 21-chloropregn-4-ene-3,20-diol, melting at about 142–160°.

To a solution of 9.74 parts of the latter crude diol in 385 parts of isopropyl alcohol is added 146 parts of activated manganese dioxide, and the resulting mixture is stirred at room temperature for about 22 hours, then is filtered, and the filtrate is concentrated to dryness at reduced pressure, resulting in crude 21-chloro-20-hydroxypregn-4-en-3-one. This crude substance is chromatographed on a silica gel column and is eluted with 10% ethyl acetate in benzene. Fractional crystallization from either ether or acetone-hexane affords two types of crystals, prismatic crystals melting at about 140° and pyramid-like crystals melting at about 170°. Further crystallization of the prismatic crystals successively from acetone-hexane, aqueous acetone, and ether-hexane results in pure 21-chloro-20β-hydroxypregn-4-en-3-one, characterized by a double melting point at about 142–150° and 160–161°. An ultraviolet absorption maximum is observed at about 241 millimicrons with a molecular extinction coefficient of about 16,100, and infrared maxima are observed at about 2.76, 5.98, and 6.19 microns. This substance displays also an optical rotation of +104.5° in chloroform and is represented by the structural formula

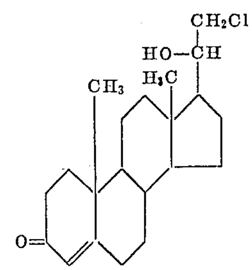

Recrystallization of the pyramid-like crystals from either afford pure 21-chloro-20α-hydroxypregn-4-en-3-one, melting at about 174–176.5°, displaying an optical rotation of +97.5° in chloroform and characterized further by an ultraviolet absorption maximum of about 240.5 millimicrons with a molecular extinction coefficient of about 16,600 and also infrared absorption maxima of about 2.76, 6.00, and 6.18 microns. The latter compound is represented by the structural formula

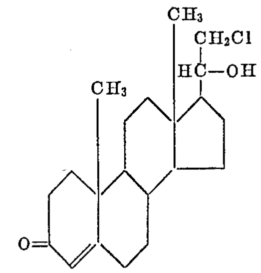

*Example 5*

A solution of 1.03 parts of 21-chloro-20β-hydroxypregn-4-en-3-one, 10 parts of acetic anhydride, and 10 parts of pyridine is kept at room temperature for about 18 hours, then is cooled and diluted with water. The resulting crude precipitate is collected by filtration and recrystallized from acetone-hexane to afford pure 20β-acetoxy-21-chloropregn-4-en-3-one, melting at about 149–150° and exhibiting an optical rotation of +114.5° in chloroform. It is characterized further by an ultraviolet absorption maximum at about 241 millimicrons with a molecular extinction coefficient of about 16,500 and also by infrared maxima at about 5.76, 6.00, 6.19, 7.94, and 8.03 microns. This substance is represented by the structural formula

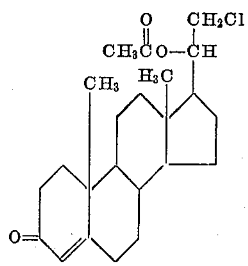

*Example 6*

A mixture of 1.43 parts of 21-chloro-20-α-hydroxypregn-4-en-3-one, 16 parts of acetic anhydride, and 16 parts of pyridine is stored at room temperature for about 16½ hours, then is poured slowly into about 200 parts of ice water. The resulting precipitate is collected by filtration and is dried to afford crude 20α-acetoxy-21-chloropropregn-4-en-3-one, melting at about 152–167°. Recrystallization from acetone-hexane affords pure 20α-acetoxy-21-chloropregn-4-en-3-one which melts at about 170–171.5° and displays an optical rotation of +2° in chloroform. An ultraviolet absorption maximum is observed at about 241 millimicrons with a molecular extinction coefficient of about 16,500, and infrared maxima are observed at about 5.73, 5.99, 6.18, and 7.99 microns. It is represented by the structural formula

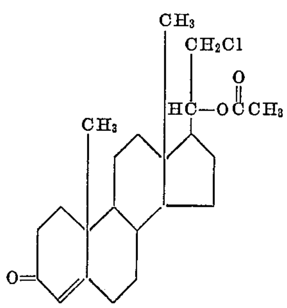

*Example 7*

The substitution of 5 parts of 21-bromopregn-4-ene-3, 20-dione and 0.48 part of lithium aluminum hydride in the procedure of Example 4 results in crude 21-bromopregn-4-ene-3,20-diol, which substance is oxidized with 66 parts of activated manganese dioxide in 175 parts of isopropyl alcohol, by the process described in Example 4, to yield 21-bromo-20-hydroxypregn-4-en-3-one. This crude substance is adsorbed on a silica gel column, which is eluted with 10% ethyl acetate in benzene. Early fractions obtained with this eluant, after recrystallization from acetonehexane afford pure 21-bromo-20α-hydroxypregn-4-en-3-one, characterized by a melting point of about 152–154°, an optical rotation of +98° in chloroform, an ultraviolet absorption maximum at about 241.5 millimicrons with a molecular extinction coefficient of about 16,100 and infrared absorption maxima at about 2.79, 6.00, and 6.19 microns. Further elution of the column with 10% ethyl acetate in benzene affords a fraction which is purified further by adsorption on a silica gel chromatographic column followed by elutions with 5% ethyl acetate in benzene and 7½% ethyl acetate in benzene. In this manner a fraction is obtained which, after recrystallization from acetone-hexane, affords pure 21-bromo-20α-hydroxypregn-4-en-3-one, melting at about 161.5–162°. It displays an optical rotation of about +93.5° in chloroform, and is characterized further by an ultraviolet absorption maximum of about 241 millimicrons with a molecular extinction of about 17,100 and also by infrared absorption maxima at about 2.82, 6.01, and 6.18 microns. The latter substance is represented by the structural formula

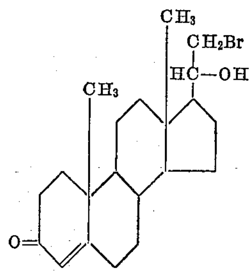

*Example 8*

A mixture of 1.45 parts of 21-bromo-20β-hydroxypregen-4-en-3-one, 15 parts of acetic anhydride, and 15 parts of pyridine is stored at 0° for about 18 hours, then is cautiously diluted with water. The precipitate which separates is collected by filtration, then is dried, resulting in crude 20β-acetoxy-21-bromopregn-4-en-3-one, melting at about 118–135°. Recrystallization from acetone-hexane affords the pure substance, characterized by a melting point of about 137.5–139°, an optical rotation of +97.5° in chloroform, an ultraviolet absorption maximum of about 241 millimicrons with a molecular extinction coefficient of 16,600 and also infrared maxima at about 5.76, 6.00, and 6.18 microns. It is represented by the structural formula

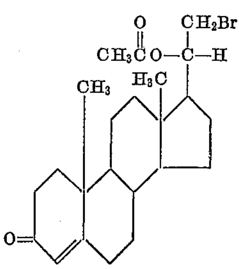

*Example 9*

The substitution of 19.5 parts of propionic anhydride in the procedure of Example 8 results in 21-bromo-20β-propionoxypregn-4-en-3-one of the structural formula

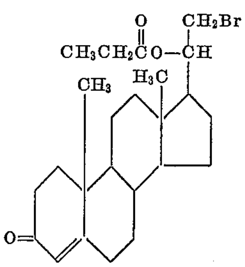

What is claimed is:

1. A compound of the structural formula

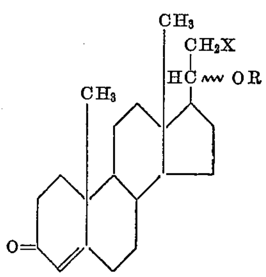

wherein X is a halogen of atomic number less than 50, and R is selected from the group consisting of hydrogen and lower alkanoyl radicals.

2. A compound of the structural formula

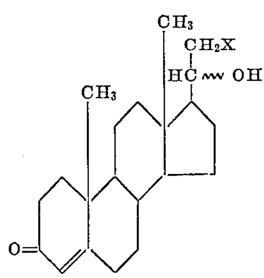

wherein X is a halogen of atomic number less than 50.

3. 21-fluoro-20β-hydroxypregn-4-en-3-one.

4. 21-fluoro-20α-hydroxypregn-4-en-3-one.

5. 21-chloro-20β-hydroxypregn-4-en-3-one.

6. 21-chloro-20α-hydroxypregn-4-en-3-one.

7. 21-bromo-20β-hydroxypregn-4-en-3-one.

8. 21-bromo-20α-hydroxypregn-4-en-3-one.

9. A compound of the structural formula

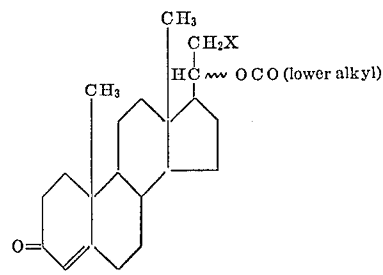

wherein X is a halogen of atomic number less than 50.

10. 20β-acetoxy-21-fluoropregn-4-en-3-one.

11. 20β-acetoxy-21-chloropregn-4-en-3-one.

12. 20α-acetoxy-21-chloropregn-4-en-3-one.

13. 20β-acetoxy-21-bromopregn-4-en-3-one.

No references cited.

UNITED STATES PATENT OFFICE

CERTIFICATE OF CORRECTION

Patent No. 3,138,623 June 23, 1964

Clarence G. Bergstrom

It is hereby certified that error appears in the above numbered patent requiring correction and that the said Letters Patent should read as corrected below.

Column 4, line 51, for "either" read -- ether --; column 5, line 29, for "propregn-" read -- pregn- --; line 63, for "-20α-" read -- -20β- --.

Signed and sealed this 1st day of December 1964.

(SEAL)
Attest:

ERNEST W. SWIDER
Attesting Officer

EDWARD J. BRENNER
Commissioner of Patents